(12) United States Patent
Dufournet

(10) Patent No.: US 6,213,003 B1
(45) Date of Patent: Apr. 10, 2001

(54) BAKERY PAN WITH CONTROLLED VOLUME FOR FOOD PRODUCTS

(76) Inventor: Marc Dufournet, 19 chemin de l'Ecu, 1219 Le Lignon (CH)

( * ) Notice: Subject to any disclaimer, the term of this patent is extended or adjusted under 35 U.S.C. 154(b) by 0 days.

(21) Appl. No.: 09/601,807

(22) PCT Filed: Feb. 10, 1999

(86) PCT No.: PCT/FR99/00283

§ 371 Date: Aug. 3, 2000

§ 102(e) Date: Aug. 3, 2000

(87) PCT Pub. No.: WO99/40795

PCT Pub. Date: Aug. 9, 1999

(30) Foreign Application Priority Data

Feb. 12, 1998 (FR) .................................................. 98 01929

(51) Int. Cl.[7] .............................. A23L 1/00; A47J 37/00; A21B 3/13; A21C 13/00
(52) U.S. Cl. ................................ 99/353; 99/426; 99/429; 99/428; 99/448; 249/82; 249/155
(58) Field of Search ............................. 99/353–355, 403, 99/372, 426–442, 448; 249/155, 168, 82, 121

(56) References Cited

U.S. PATENT DOCUMENTS

| | | | |
|---|---|---|---|
| 2,167,038 | * | 7/1939 | Damon .................................. 249/155 |
| 3,339,878 | * | 9/1967 | Lind ....................................... 249/82 |
| 3,612,036 | * | 10/1971 | Kaufman ............................. 99/447 X |
| 4,649,053 | * | 3/1987 | Lamonica ............................ 99/432 X |
| 5,690,019 | * | 11/1997 | Barker et al. ....................... 99/442 X |
| 5,692,431 | * | 12/1997 | Herring ................................... 99/426 |

FOREIGN PATENT DOCUMENTS

| | | |
|---|---|---|
| 2695802 | 3/1994 | (FR) . |
| 1003099 | 11/1997 | (NL) . |

* cited by examiner

*Primary Examiner*—Timothy F. Simone
(74) *Attorney, Agent, or Firm*—William H. Eilberg

(57) ABSTRACT

The invention concerns a bakery pan including a base plate (17) provided with a plurality of slots associated with a plurality of peripheral walls (1–9) defining cells each closed by a base and open along a through aperture (10) corresponding to one slot. In each cell, an intermediate mobile wall (12) moves along the cell median axis (I-I), and is integral with an adjusting rod (13) sliding in a guiding passage. A removable support plate (19) is associated with the base plate (17) from which it is spaced by an interchangeable spacer (20). A closure plate can cover the base plate (17) for closing the through apertures (10). This bakery pan structure greatly facilitates garnishing, and makes it possible to mould a food product such as pastry to give it a shape defined by the cells.

9 Claims, 3 Drawing Sheets

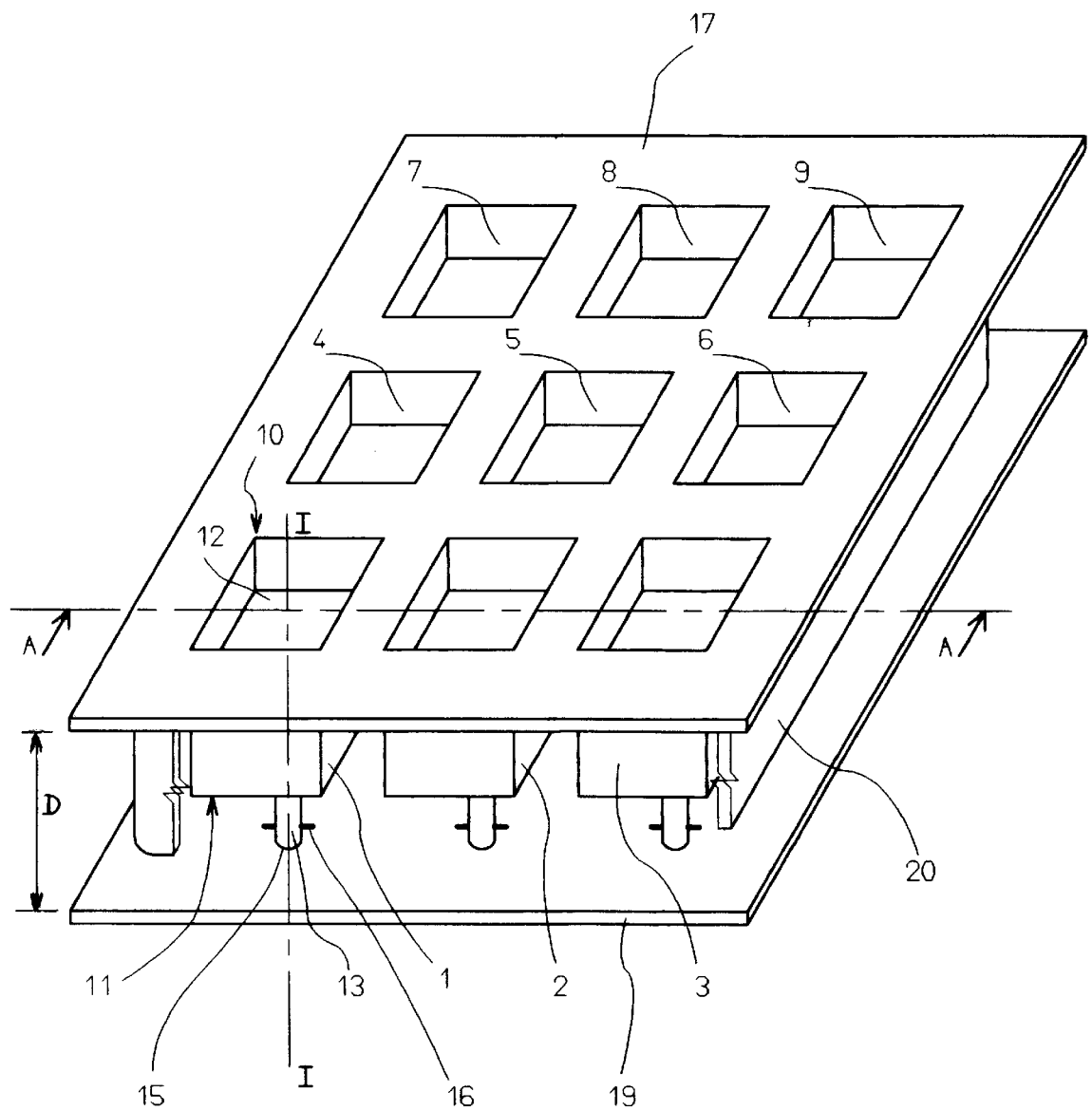
Fig_1

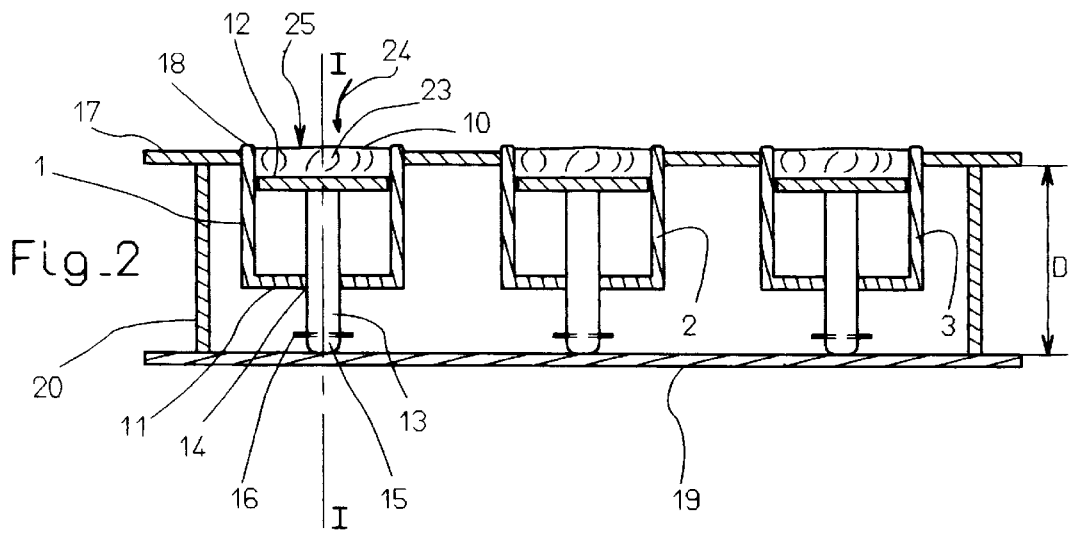
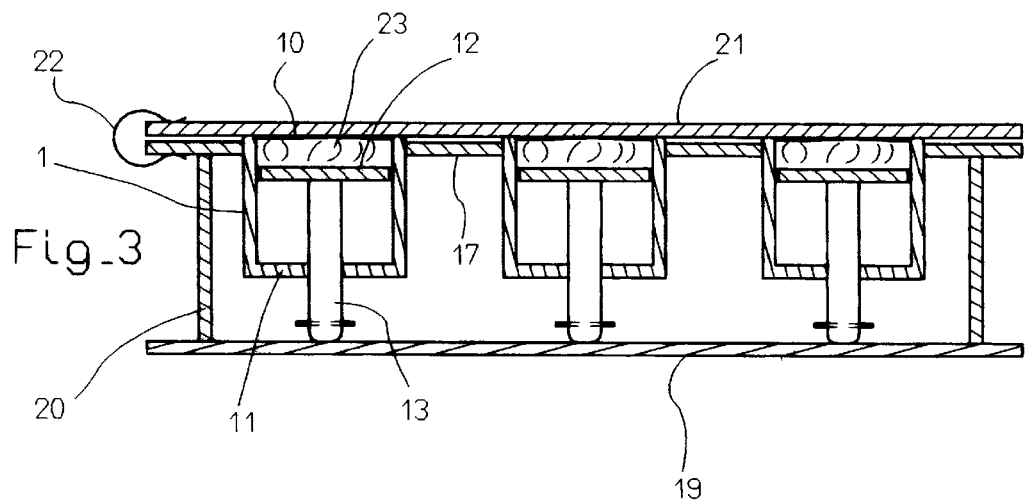
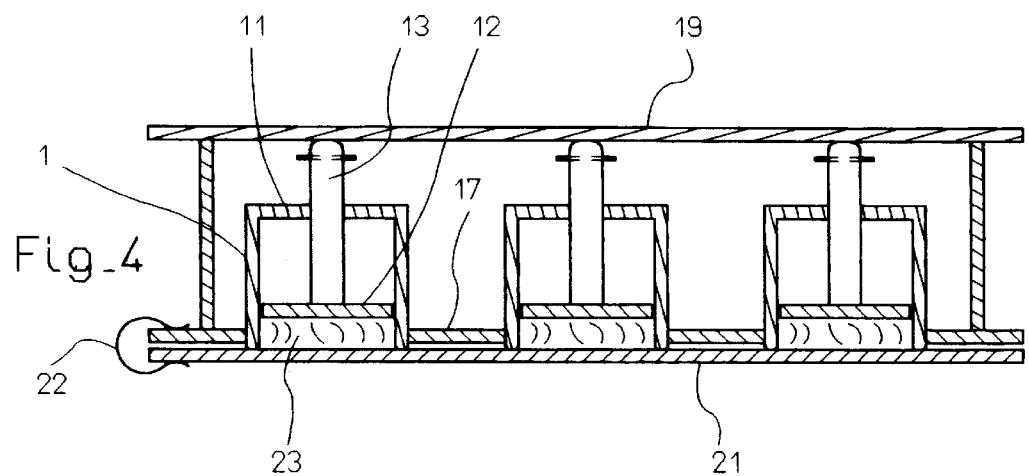

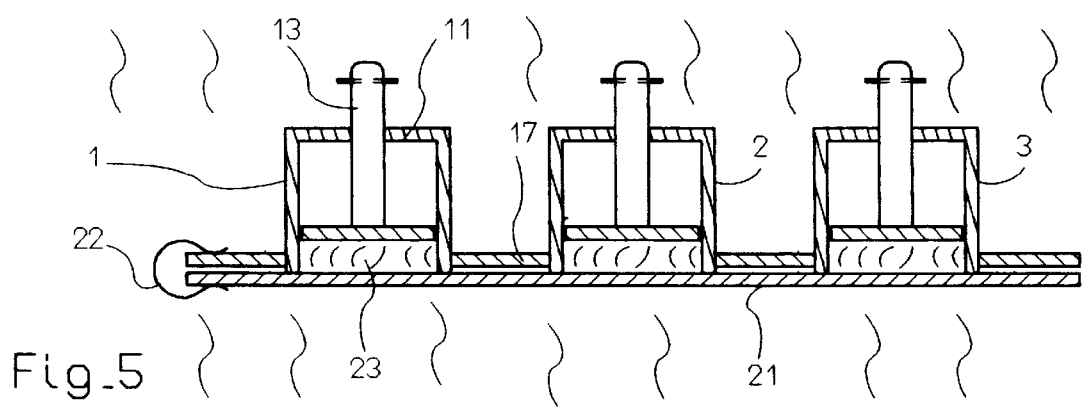
Fig_5
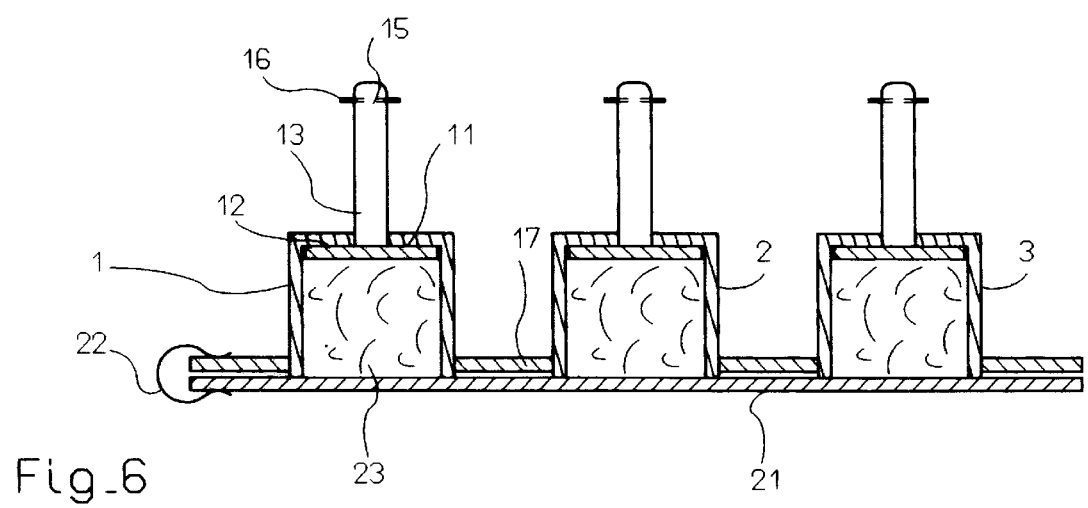
Fig_6
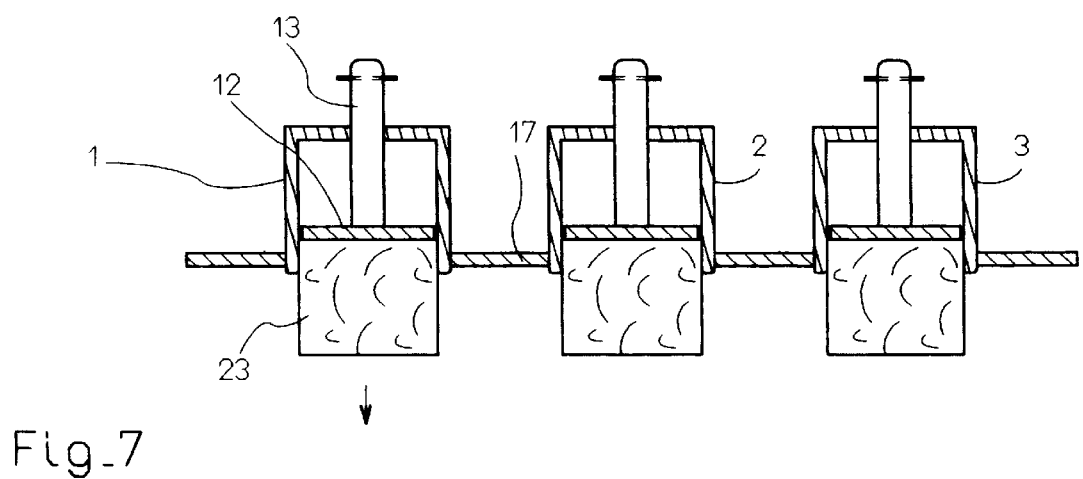
Fig_7

US 6,213,003 B1

BAKERY PAN WITH CONTROLLED VOLUME FOR FOOD PRODUCTS

TECHNICAL FIELD OF THE INVENTION

The present invention relates to pans for preparing food products which can expand during cooking.

To impart a particular shape to a food product such as pastry after it has been cooked, a pan is generally used that is partly filled with pastry, and so the pastry expands freely and occupies all of the volume of the pan at the end of cooking.

A pan which is open at the top is most usually employed so that any excess pastry can project out of the pan. However, the final shape of the product is then not entirely determined, because its top face depends on the initial quantity of pastry introduced into the pan and on the capacity of the pastry for expansion while cooking.

If all the faces of the pastry are to be molded at the end of cooking, the pan must be closed and its volume must correspond as accurately as possible to the total volume of the pastry at the end of cooking. This condition is difficult to satisfy because the expansion of the pastry during cooking depends on a large number of factors, in particular on objective cooking conditions such as the temperature, but also on the nature of the pastry and its ingredients. It is therefore necessary to control accurately the quantity of pastry that is introduced into the pan.

If the quantity of pastry is insufficient to fill all of the volume of the pan after cooking, molding is incomplete and the product has a random final shape.

On the other hand, if the quantity of pastry is too large, the expansion of the pastry tends to open the pan or to compress the material inside the pan, which leads to a more dense molding and affects the taste and mechanical properties.

The document FR 2 695 802 A describes various bakery pans with an adjustable filling in which a peripheral wall of the pan, parallel to an axis, is open at a through-aperture and joined to a closed base, defining an internal volume open at the through-aperture opposite the base, and shaped to contain and mould food products such as pastry while they are cooking. A mobile intermediate wall slides freely and with a small clearance in the peripheral wall in the direction parallel to the axis towards and away from the base. Means are provided for temporarily holding the mobile intermediate wall in a chosen intermediate position along its sliding stroke between the base and the through-aperture. In the above document, the mobile intermediate wall is held in an intermediate filling position by a removable wedge. With the wedge removed, the mobile intermediate wall can slide as cooking proceeds.

One problem is that the expansion of the pastry in a pan of the above kind is somewhat random and asymmetrical, and the mobile intermediate wall often jams, causing defects in the molded shape of the pastry after molding.

Another problem is that, if there is a plurality of associated pans side-by-side, it is necessary to provide a wedge for each pan, to introduce it individually into the pan, and then to extract it individually, which considerably complicates handling.

Also, with a device of the above kind, the filling of the pan is complex as all the wedges must be held in the chosen position simultaneously.

STATEMENT OF THE INVENTION

The problem addressed by the present invention is that of designing a new bakery pan structure allowing adjustable filling, which is reliable in operation, which achieves molding of defined shape without risk of defects, and which facilitates filling of the pan during the initial step of filling.

The invention also aims to facilitate handling of the pan during the preparation and cooking steps, as well as during removal of the cooked product from the pan, by avoiding individual handling operations.

To achieve the above and other objects, a bakery pan according to the invention for food products includes:

- at least one tubular peripheral wall generally parallel to a median axis, open at a first end at a through-aperture, and joined at a second end to a base, defining a pan element having an internal volume open at the through-aperture opposite the base and shaped to contain and mould the food products while they are cooking,
- a mobile intermediate wall sliding freely and with a small clearance in the peripheral wall over a sliding stroke in the direction parallel to the median axis and towards and away from the base, and closing the internal molding volume on the side opposite the through-aperture,
- means for temporarily holding the mobile intermediate wall in a chosen intermediate filling position along its sliding stroke between the base and the through-aperture,
- an adjusting rod, fastened to the mobile intermediate wall, sliding freely and with a small clearance in a median passage of the base, along the median axis, and longer than the sliding stroke of the mobile intermediate wall, with an end stop preventing it escaping from the median channel in the direction of the through-aperture,
- a baseplate, having an opening in corresponding relationship to the through-aperture and fastened to the outside face of the peripheral wall,
- means for temporarily holding the adjusting rod in a chosen intermediate position during filling of the pan.

Because of the adjusting rod, the mobile intermediate wall slides reliably in the peripheral wall, despite random imbalances in the thrust of the pastry as it expands during cooking, with the result that the pastry is sure to occupy the whole of the volume of the pan in a regular manner at the end of cooking. Also, the mobile intermediate wall is held effectively in the filling position, with the result that the filling operation carried out by the user is correct.

In one advantageous embodiment of the invention, the means for temporarily holding the adjusting rod in a chosen intermediate position include:

- a support plate,
- removable and interchangeable spacer means adapted to be inserted around the peripheral wall between the support plate and the baseplate, with the end of the adjusting rod pressed against the support plate, to hold the baseplate away from the support plate by a distance such that the adjusting rod holds the mobile intermediate wall in the chosen intermediate filling position.

The pan preferably further includes an attached closure plate adapted to close off the through-aperture selectively, with holding means for holding the closure plate pressed against the peripheral edge of the through-aperture.

The spacer means can advantageously include a set of interchangeable tubular frames each of which is shaped to surround the peripheral wall(s) of the pan.

The invention can be applied to a pan structure with a single cell, having a single interior volume.

However, the number of cells that can be filled simultaneously can advantageously be increased, by providing a plurality of peripheral walls attached to the same generally plane baseplate with a plurality of openings and each having a base and a mobile intermediate wall, the mobile intermediate walls being associated with adjusting rods of the same length.

BRIEF DESCRIPTION OF THE DRAWINGS

Other objects, features and advantages of the present invention will emerge from the following description of particular embodiments of the invention, which is given with reference to the accompanying drawings, in which:

FIG. 1 is a perspective view of a pan structure according to one embodiment of the present invention;

FIG. 2 is a view in cross section taken along the line A—A in FIG. 1, in a filling position;

FIG. 3 is a view in cross section taken along the line A—A at the end of the filling operation, after closing the pan;

FIG. 4 is a view in cross section in an overturned position prior to cooking;

FIG. 5 shows the pan during cooking;

FIG. 6 shows the pan at the end of cooking with the pastry occupying all the volume; and FIG. 7 shows the pan during removal of the pastry from the pan.

DESCRIPTION OF THE PREFERRED EMBODIMENTS

In the embodiment shown in the figures, the bakery pan according to the invention comprises nine peripheral walls designated by the respective numbers 1 to 9 of the same tubular shape, each open at a first end at a through-aperture and joined at a second end to a respective base. Thus, the peripheral wall 1 is generally parallel to a median axis I-I, is open at the through-aperture 10, and has a base 11, defining a pan element having an internal volume open at the through-aperture 10 opposite the base 11.

In the embodiment shown in the figures, the peripheral wall 1 defines a tubular pan element of parallelepipedal shape, for example of cubical shape, enabling cubical blocks of pastry to be produced. One application is to making cream buns of cubical shape for building ornamental cakes.

Each pan element delimited by a peripheral wall such as the peripheral wall 1 includes a mobile intermediate wall 12, which slides freely and with a small clearance in the peripheral wall 1 along a sliding stroke in the direction parallel to the median axis I-I towards and away from the base 11.

An adjusting rod 13, fastened at its first end to the mobile intermediate wall 12, slides freely and with a small clearance along the median axis I-I in a median passage 14 in the base 11. The adjusting rod 13 is longer than the sliding stroke of the mobile intermediate wall 12 in the peripheral wall 1, with the result that the second end 15 of the adjusting rod 13 remains at all times outside the pan. An end stop 16 can be provided at the second end 15 of the adjusting rod 13, to prevent the adjusting rod 13 escaping from the median passage 14 in the direction of the through-aperture 10.

It may be advantageous to provide means for encouraging sliding of the mobile intermediate wall 12 in the peripheral wall 1. To this end, the median passage 14 of the base 11 has a tubular shape and is long enough to guide the adjusting rod 13 longitudinally. At the same time, the peripheral wall 1 has an inner clearance to define a molding volume in the shape of a truncated pyramid decreasing slightly in size in the direction of the base 11. The base 11 can also be apertured, for example it can consist of a crossmember occupying only part of the cross section of the pan element. The dimensions of the mobile intermediate wall 12 are preferably such that when the pastry being cooked stops expanding it is wedged in the peripheral wall 1 in the vicinity of the base 11 and thus provides a peripheral seal preventing the pastry escaping from the pan element.

A generally plane baseplate 17 has a plurality of openings each of which corresponds to one of the through-apertures of the pan elements delimited by the respective peripheral walls 1 to 9. The openings in the baseplate 17 are the same shape as and distributed in the same way as the respective through-apertures, such as the through-aperture 10 of the pan elements. The adjusting rods, such as the adjusting rod 13 of the pan elements, are all the same length.

Each through-aperture, such as the through-aperture 10, is preferably bordered at the outside by a peripheral rib 18, projecting from the outside face of the baseplate 17. The rib 18 prevents the formation of flash at the periphery of the last face of the pastry to be molded.

In the embodiment shown in the drawings, the peripheral rib 18 is relatively low in height, to enable several pan elements to be filled simultaneously. Some pastry nevertheless remains on the outside face of the baseplate 17, and expands during cooking. This results in a risk of leakage out of the pan element, affecting the final shape of the block of pastry formed. To avoid this default, it can be advantageous to increase the height of the peripheral rib 18, by placing the baseplate 17 at an intermediate height around the peripheral wall 1.

In accordance with the invention, means are provided for holding the adjusting rod 13 temporarily in a chosen intermediate position for filling the pan.

In the embodiment shown in the figures, the means for temporarily holding the adjusting rod 13 in the filling position include a generally plane support plate 19 that the user can place to form a support for all of the second ends 15 of the adjusting rods 13, by fitting removable and interchangeable spacer means 20 around the peripheral wall 1 between the support plate 19 and the baseplate 17. The spacer means 20 are removable and interchangeable, and hold the baseplate 17 away from the support plate 19 by a distance D such that the adjusting rod 13 holds the mobile intermediate wall 12 in a chosen intermediate filling position.

This chosen intermediate position of the mobile intermediate wall 12 is such that the volume occupied between the mobile intermediate wall 12 and the through-aperture 10 corresponds to the appropriate volume of pastry for the pastry to occupy all of the volume of the pan element at the end of cooking.

The user therefore chooses one of a plurality of removable and interchangeable spacer means 20, according to the required quantity of pastry.

The pan according to the invention preferably further includes a closure plate 21, shown in FIGS. 3 to 6, which can be generally plane and have the same dimensions as the baseplate 17. The closure plate 21 is removable and selectively closes off the through-apertures such as the through-aperture 10. Holding means such as lateral clips 22 hold the closure plate 21 pressed against the peripheral ribs 18 flanking the through-apertures 10.

The lateral clips 22 are removable, and adapted to engage laterally along the edges of the baseplate 17 and the closure plate 21, squeezing said plates 17 and 21 together.

A set of interchangeable and closed or open tubular frames can advantageously be provided, each shaped to surround all of the peripheral walls 1 to 9 of the pan elements, as shown in FIG. 1. Each tubular frame constitutes separate spacer means 20 having a different height D.

In a different embodiment of the invention, the means for temporarily holding the adjusting rod 13 in a chosen intermediate filling position can include a key movable along the outside portion of the adjusting rod 13 and abutting against the outside face of the base 11 when the second end 15 of the adjusting rod 13 of the bakery pan rests on a worksurface.

How the pan constituting the first embodiment of the invention is used will now be explained with reference to the accompanying drawings.

As shown in FIGS. 1 and 2, the user first places spacer means 20 on a support plate 19, and then places the baseplate 17 on the spacer means 20 with the through-apertures 10 orientated towards the top. Due to gravity, the guide rods 13 each bear at their second end 15 against the support plate 19, freeing the necessary volume for filling with pastry. In this position, the pastry 23 can be fed in by the user via the through-aperture 10, as shown by the arrow 24 in FIG. 2, for example using a spatula with which the top face 25 of the pastry is leveled off flush with the peripheral rib 18. A perfectly defined quantity of pastry is therefore placed in each pan element.

As shown in FIG. 3, the user closes the pan elements by fitting the closure plate 21, and fixing it using the lateral clips 22.

Squeezing the closure plate 21 and the support plate 19 together by hand, the user can then turn over the assembly, into the position shown in FIG. 4, with the closure plate 21 at the bottom position and the support plate 19 at the top position. The user can then withdraw the support plate 19 and the spacer means 20, which have no function in subsequent stages of cooking.

As shown in FIG. 5, the assembly made up of the baseplate 17, the pan elements delimited by the peripheral walls 1 and the bases 11, and the closure plate 21, associated by means of the lateral clips 22, is placed in an oven or on a hotplate for the time needed to cook the pastry 23. During cooking, as shown in FIG. 6, the pastry 23 expands and pushes the mobile intermediate wall 12 towards the base 11. At the end of cooking, the pastry 23 occupies all of the inside volume of the pan, the mobile intermediate wall 12 being pressed against the base 11.

The user can then remove the whole away from the hotplate or oven, and after removing the lateral clips 22 and the closure plate 21, the combination of the pastry 23, the mobile intermediate wall 12 and the adjusting rod 13 tends to move downwards under its own weight, releasing the molded pastry 23. As an alternative to this, the user can push out each molded pastry 23 by pushing on the adjusting rod 13.

The pan is then ready for re-use.

The present invention is not limited to the embodiments explicitly described, but includes variants and generalizations thereof within the scope of the following claims.

What is claimed is:

1. Bakery pan for food products, including:
    at least one tubular peripheral wall (1) generally parallel to a median axis (I-I), open at a first end at a through-aperture (10), and joined at a second end to a base (11), defining a pan element having an internal volume open at the through-aperture (10) opposite the base (11) and shaped to contain and mould the food products (23) while they are cooking,
    a mobile intermediate wall (12), sliding freely and with a small clearance in the peripheral wall (1) over a sliding stroke in the direction parallel to the median axis (I-I) towards and away from the base (11), and closing the internal molding volume on the side opposite the through-aperture (10),
    means for temporarily holding the mobile intermediate wall (12) in a chosen intermediate filling position along its sliding stroke between the base (11) and the through-aperture (10),
    wherein it includes:
        an adjusting rod (13), fastened to the mobile intermediate wall (12), sliding freely and with a small clearance in a median passage (14) of the base (11), along the median axis (I-I), and longer than the sliding stroke of the mobile intermediate wall (12), with an end stop (16) preventing it escaping from the median passage (14) in the direction of the through-aperture (10),
        a baseplate (17), having an opening in corresponding relationship to the through-aperture (10) and fastened to the outside face of the peripheral wall (1),
        means (19, 20) for temporarily holding the adjusting rod (13) in a chosen intermediate position during filling of the pan.

2. Pan according to claim 1, wherein the means for temporarily holding the adjusting rod (13) in a chosen intermediate position include:
    a support plate (19),
    removable and interchangeable spacer means (20) adapted to be inserted around the peripheral wall (1) between the support plate (19) and the baseplate (17), with the end (15) of the adjusting rod (13) pressed against the support plate (19), to hold the baseplate (17) away from the support plate (19) by a distance (D) such that the adjusting rod (13) holds the mobile intermediate wall (12) in the chosen intermediate filling position.

3. Pan according to claim 2, wherein it further includes an attached closure plate (21), adapted to close off the through-aperture (10) selectively, with holding means (22) for holding the closure plate (21) pressed against the peripheral edge of the through-aperture (10).

4. Pan according to claim 3, wherein the holding means are removable lateral clips (22) adapted to engage laterally along the edges of the baseplate (17) and of the closure plate (21), squeezing said plates (17, 21) together.

5. Pan according to claim 2, wherein it includes a set of interchangeable tubular frames each of which is shaped to surround the peripheral wall(s) (1–9) of the pan and to constitute spacer means (20).

6. Pan according to claim 1, wherein the means for temporarily holding the adjusting rod (13) in a chosen intermediate filling position include a key movable along the outside portion of the adjusting rod (13) and abutting against the outside face of the base (11) when the second end of the adjusting rod (13) of the bakery pan rests on a worksurface.

7. Pan according to claim 1, wherein it includes a plurality of peripheral walls (1–9) which are fastened to a common generally plane baseplate (17) with a plurality of openings in it and each of which has a base (11) and a mobile intermediate wall (12), the mobile intermediate walls (12) being associated with adjusting rods (13) of the same length.

8. Pan according to claim 1, wherein each through-aperture (10) is bordered on the outside by a peripheral rib (18) projecting from the outside face of the baseplate (17).

9. Pan according to claim 1, wherein:

the median passage (14) of the base (11) is tubular in shape and long enough to guide the adjusting rod (13) longitudinally, the peripheral wall (1) has an inner clearance to define a molding space in the shape of a truncated pyramid decreasing slightly in size in the direction of the base (11), the base (11) is apertured, the dimensions of the mobile intermediate wall (12) are such that at the end of expansion of the pastry during cooking it is wedged in the peripheral wall (1) to provide a seal.

\* \* \* \* \*